United States Patent
Orlans

(10) Patent No.: US 10,456,717 B2
(45) Date of Patent: Oct. 29, 2019

(54) DISC FILTER INCLUDING DISC CLEANING ASSEMBLY

(71) Applicant: Yitzhak Orlans, Tel Aviv (IL)

(72) Inventor: Yitzhak Orlans, Tel Aviv (IL)

( * ) Notice: Subject to any disclaimer, the term of this patent is extended or adjusted under 35 U.S.C. 154(b) by 648 days.

(21) Appl. No.: 14/070,751

(22) Filed: Nov. 4, 2013

(65) Prior Publication Data

US 2015/0122723 A1   May 7, 2015

(51) Int. Cl.
*B01D 29/68* (2006.01)
*B01D 35/153* (2006.01)
(Continued)

(52) U.S. Cl.
CPC .......... *B01D 29/682* (2013.01); *B01D 29/055* (2013.01); *B01D 29/33* (2013.01);
(Continued)

(58) Field of Classification Search
CPC .... B01D 29/114; B01D 29/46; B01D 29/682; B01D 29/665; B01D 29/39; B01D 29/395; B01D 29/41; B01D 29/413; B01D 29/416; B01D 29/43; B01D 29/70; B01D 29/15; B01D 29/606; B01D 29/58; B01D 29/668; B01D 29/74; B01D 29/117; B01D 29/6483; B01D 29/6453; B01D 29/661; B01D 29/684; B01D 29/904; B01D 29/92;
(Continued)

(56) References Cited

U.S. PATENT DOCUMENTS 3,203,549 A   8/1965   Schaedler
4,299,245 A   11/1981  Clapper
(Continued)

FOREIGN PATENT DOCUMENTS

EP   1 110 591 B1   1/2003
EP   1110591 B1 *  1/2003 ............. B01D 29/15
(Continued)

OTHER PUBLICATIONS

Arkal filtration systems water filtration, disc filter AGF media filter, http://www.arkal-filterscom/pro-spin.html downloaded Sep. 17, 2011.
(Continued)

*Primary Examiner* — Jason M Greene
*Assistant Examiner* — Brad Gordon
(74) *Attorney, Agent, or Firm* — Womble Bond Dickinson (US) LLP

(57) ABSTRACT

A disc filter including a stack of apertured filter discs arranged about an axis, the stack having an outer surface and an inner surface and being mounted such that during backflush, individual discs are rotatable relative to adjacent discs about the axis and a disc cleaning assembly operative to rotate at least some of the discs about the axis relative to others of the discs, the disc cleaning assembly including at least one first fluid conduit for producing at least one outer liquid jet directed generally tangentially into engagement with the outer surface of the stack for rotationally driving the at least some of the discs about the axis relative to others of the discs and at least one second fluid conduit for producing at least one inner backflushing liquid jet directed into engagement with the inner surface of the stack.

31 Claims, 10 Drawing Sheets

(51) Int. Cl.
*B01D 29/46* (2006.01)
*B01D 29/64* (2006.01)
*B01D 29/33* (2006.01)
*B01D 29/66* (2006.01)
*B01D 29/70* (2006.01)
*B01D 29/05* (2006.01)
*B01D 29/52* (2006.01)

(52) U.S. Cl.
CPC ............ *B01D 29/46* (2013.01); *B01D 29/52* (2013.01); *B01D 29/6446* (2013.01); *B01D 29/66* (2013.01); *B01D 29/70* (2013.01); *B01D 35/153* (2013.01); *B01D 2201/186* (2013.01); *B01D 2201/583* (2013.01)

(58) Field of Classification Search
CPC ............ B01D 29/055; B01D 29/6446; B01D 2201/084; B01D 2201/02; B01D 2201/282; B01D 2201/583; B01D 35/14; B01D 35/153
USPC ........... 210/411, 108, 488, 333.01, 354, 356, 210/393, 107, 136, 331, 332, 351, 352, 210/390, 391, 407, 408, 412, 413, 791
See application file for complete search history.

(56) References Cited

U.S. PATENT DOCUMENTS

| | | | |
|---|---|---|---|
| 4,655,910 A | 4/1987 | Tabor | |
| 4,762,615 A * | 8/1988 | Drori | B01D 29/15 210/333.01 |
| 4,923,601 A * | 5/1990 | Drori | B01D 29/114 210/107 |
| 4,935,126 A * | 6/1990 | Drori | B01D 25/26 210/107 |
| 5,013,461 A * | 5/1991 | Drori | B01D 29/114 210/193 |
| 5,030,347 A * | 7/1991 | Drori | B01D 25/26 210/331 |
| 5,384,045 A * | 1/1995 | Chmielewski | B01D 29/21 210/354 |
| 6,398,037 B1 | 6/2002 | Sadan et al. | |
| 8,069,989 B1 * | 12/2011 | Gordon | B01D 29/114 210/408 |
| 2005/0178704 A1 | 8/2005 | Prochaska et al. | |
| 2006/0144768 A1 * | 7/2006 | Harris | B01D 29/114 210/106 |
| 2010/0213109 A1 * | 8/2010 | Ben-Horin | B01D 29/114 210/136 |
| 2013/0270163 A1 | 10/2013 | Zur et al. | |

FOREIGN PATENT DOCUMENTS

| | | | |
|---|---|---|---|
| EP | 1110591 B1 * | 1/2003 | ............ B01D 29/15 |
| EP | 2138219 A1 | 12/2009 | |
| FR | 2 944 454 | 10/2010 | |
| WO | WO2012046240 A1 * | 4/2012 | |
| WO | WO-2012046240 A2 * | 4/2012 | ............ B01D 29/114 |
| WO | WO 2012073247 A1 * | 6/2012 | ............ B01D 29/117 |

OTHER PUBLICATIONS

The Apollo Disc-Kleen Filter by NETAFIM USA (Brochure Consisting of 7 Pages) Jan. 2013.
Galaxy Disc-Kleen Filter Batteries NETAFIM USA (Brochure Consisting of 2 Pages) Jul. 2007.
International Search Report and Written Opinion dated Mar. 20, 2015; PCT/IL14/50954.
Extended European search report dated May 2, 2017, in counterpart international (PCT) application (No. PCT/IL2014/050954).
Official action dated Jul. 31, 2017, issued in Chinese patent application (No. 2014800596342) (no translation).

\* cited by examiner

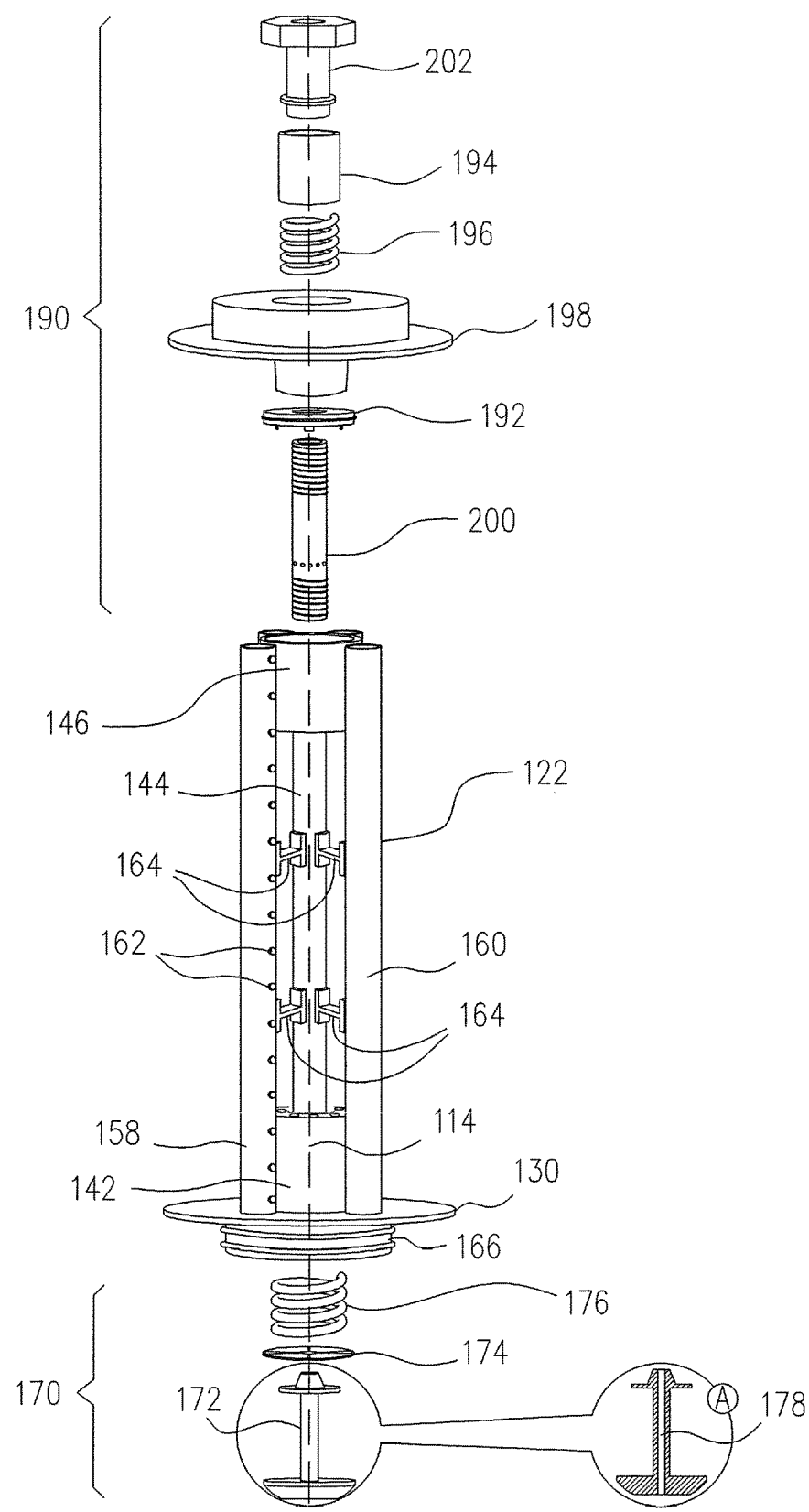

DISC FILTER INCLUDING DISC CLEANING ASSEMBLY

FIELD OF THE INVENTION

The present invention relates to fluid filters generally and more particularly to backflushable disc filters.

BACKGROUND OF THE INVENTION

Various types of backflushable disc filters are known.

SUMMARY OF THE INVENTION

The present invention seeks to provide an improved backflushable disc filter.

There is thus provided in accordance with a preferred embodiment of the present invention a disc filter including at least one stack of apertured filter discs arranged about an axis, the at least one stack having an outer surface and an inner surface and being mounted such that during backflush, individual discs are rotatable relative to adjacent discs about the axis and a disc cleaning assembly operative to rotate at least some of the discs in the at least one stack about the axis relative to others of the discs in the at least one stack, the disc cleaning assembly including at least one first fluid conduit for producing at least one outer liquid jet directed generally tangentially into engagement with the outer surface of the at least one stack for rotationally driving the at least some of the discs in the at least one stack about the axis relative to others of the discs in the at least one stack and at least one second fluid conduit for producing at least one inner backflushing liquid jet directed into engagement with the inner surface of the at least one stack.

Preferably, the at least one stack of apertured filter discs is arranged in a compressed stacked disc operative orientation during filtering operation and arranged in a non-compressed disc operative orientation during backflushing operation.

In accordance with a preferred embodiment of the present invention the disc filter also includes a core element lying interiorly of and nearly touching each of the at least one stack of apertured filter discs. Additionally, the core element includes a central vertical conduit. Alternatively or additionally, the core element includes at least one peripheral vertical conduit. Additionally or alternatively, at least one of the at least one peripheral vertical conduit is formed with a vertical array of outwardly directed backflush water outlet apertures.

Preferably, the disc filter also includes a first piston assembly disposed within the core element and a second piston assembly disposed within the core element. In accordance with a preferred embodiment of the present invention in a filtering operative orientation, the first piston assembly is in an open state and the second piston assembly is in a closed state and in a backflushing operative orientation, the first piston assembly is in a closed state and the second piston assembly is in an open state.

In accordance with a preferred embodiment of the present invention in the filtering operative orientation, the first piston assembly is operative to allow filtered water to flow therethrough from an inlet opening to an outlet opening.

Preferably, the first piston assembly includes a piston element including a throughgoing bore. Additionally, the throughgoing bore allows water flow therethrough even when the first piston assembly is in the closed state.

In accordance with a preferred embodiment of the present invention the disc cleaning assembly includes at least one upstanding backflow water conduit including a generally vertical array of backflow water outlet apertures. Additionally, the at least one upstanding backflow water conduit communicates with a liquid flow opening of the filter.

In accordance with a preferred embodiment of the present invention the at least one stack of apertured filter discs includes a plurality of stacks of apertured filter discs and the disc cleaning assembly includes at least one upstanding backflow water conduit including a plurality of generally vertical arrays of backflow water outlet apertures, the plurality of generally vertical arrays providing a plurality of outer located liquid jets directed generally tangentially into engagement with different ones of the plurality of stacks.

Preferably, the apertured filter discs include generally radially grooved filter discs.

BRIEF DESCRIPTION OF THE DRAWINGS

The present invention will be understood and appreciated more fully from the following detailed description, taken in conjunction with the drawings in which:

FIG. 4 is a simplified exploded view illustration of a portion of the backflushable disc filter of FIGS. 1A-3B;

DETAILED DESCRIPTION OF A PREFERRED EMBODIMENT

Figure 1A:
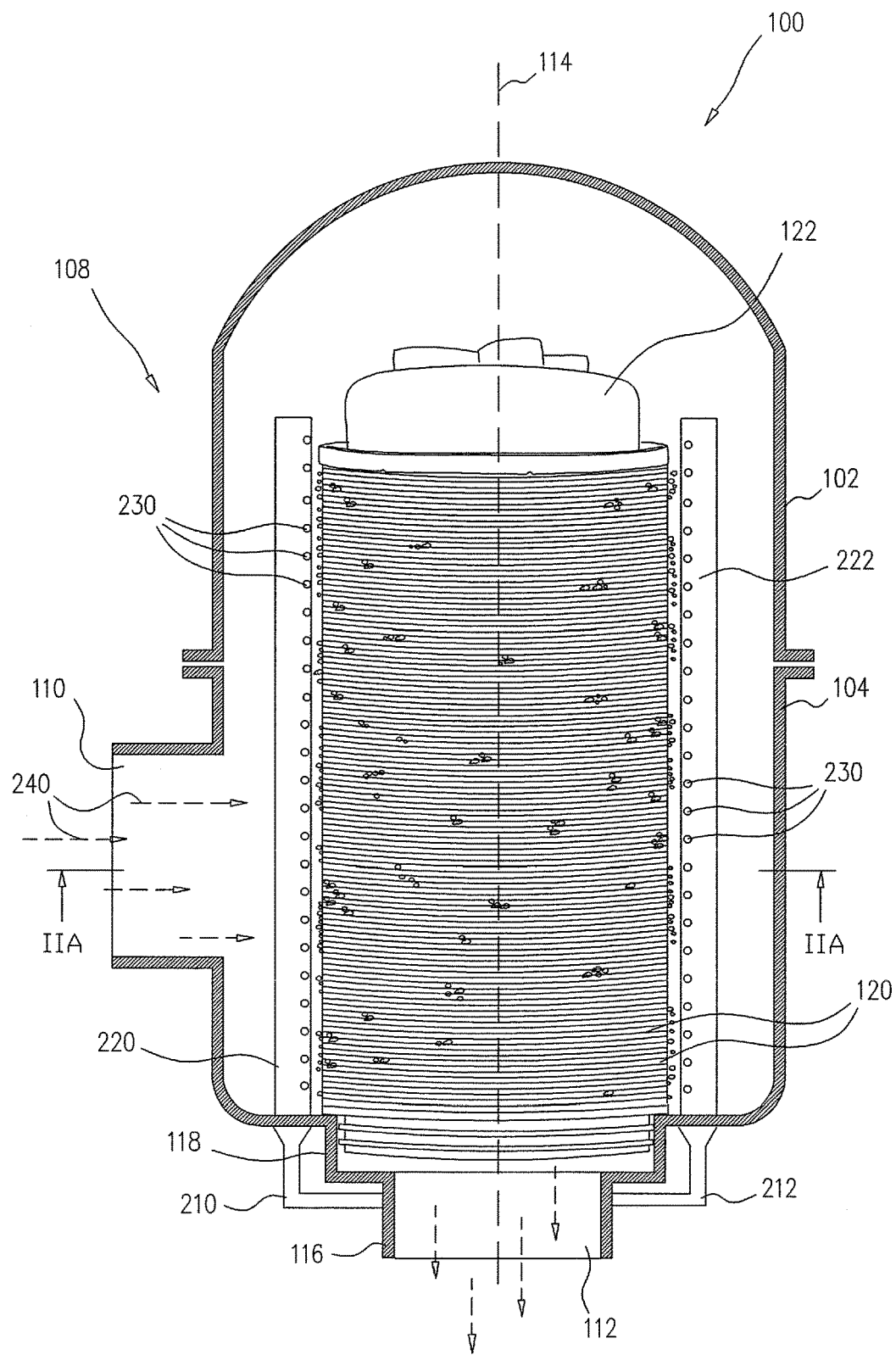
FIGS. 1A & 1B are simplified partially cut away illustrations of the operation of a backflushable disc filter constructed and operative in accordance with a preferred embodiment of the present invention in respective filtering and backflushing modes of operation.
Figure 1B:
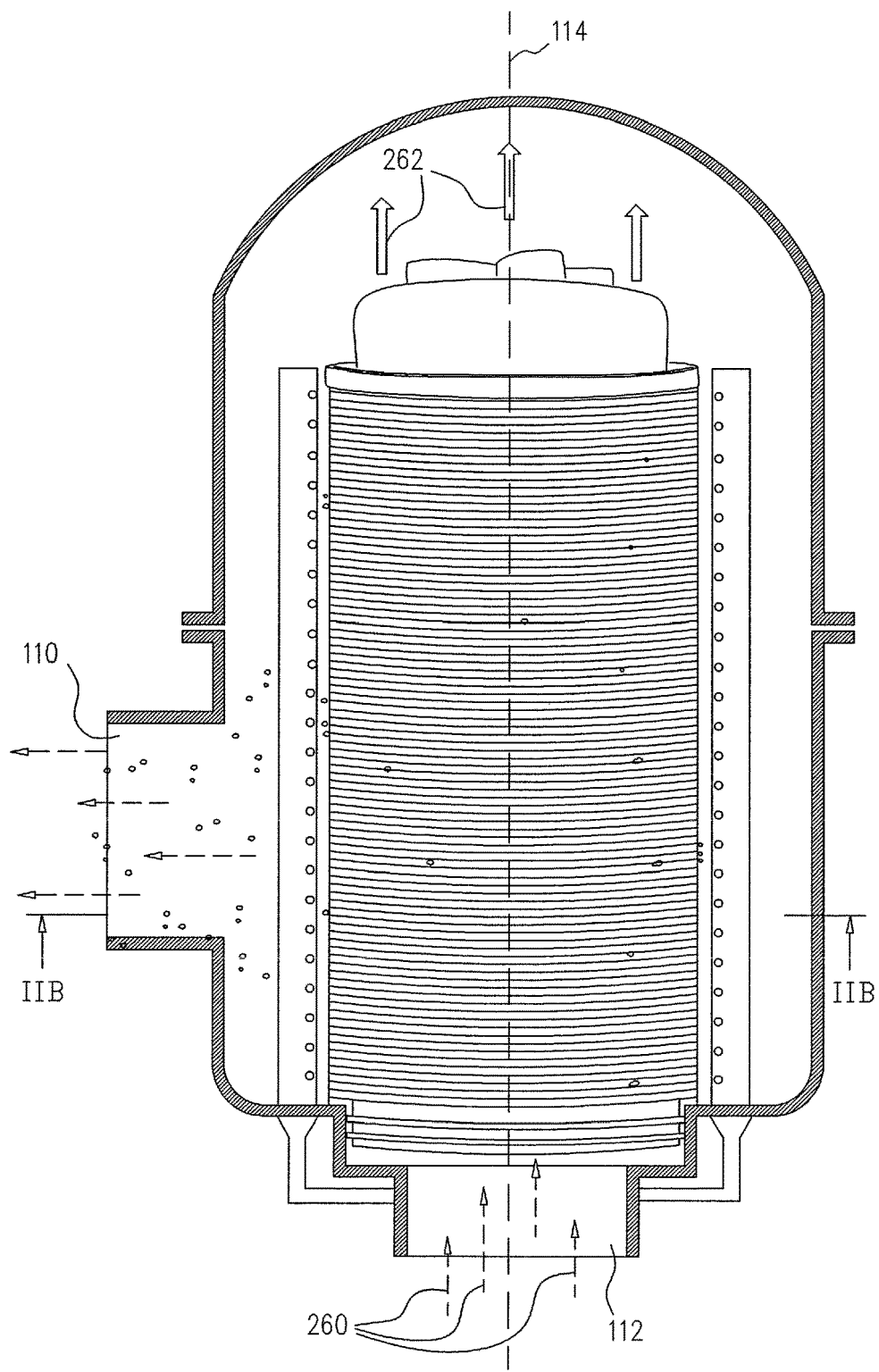
Figure 2A:
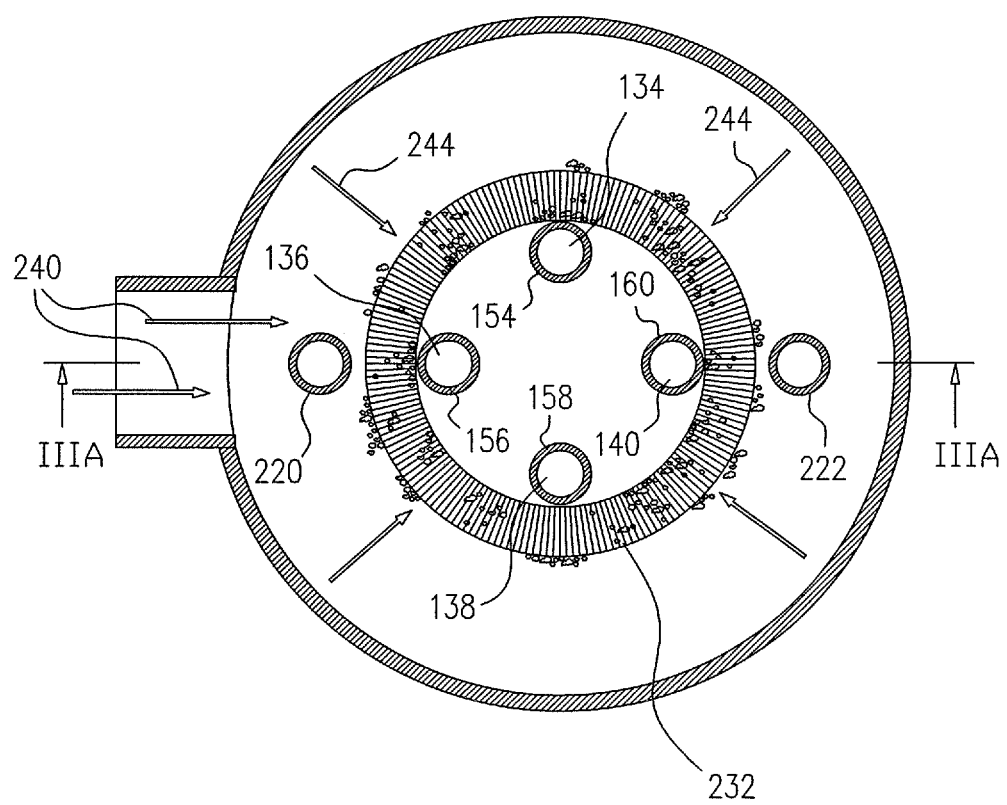
FIGS. 2A & 2B are simplified sectional illustrations of the operation of the backflushable disc filter of FIGS. 1A and 1B, taken along respective lines IIA-IIA and IIB-IIB in respective FIGS. 1A & 1B.
Figure 2B:
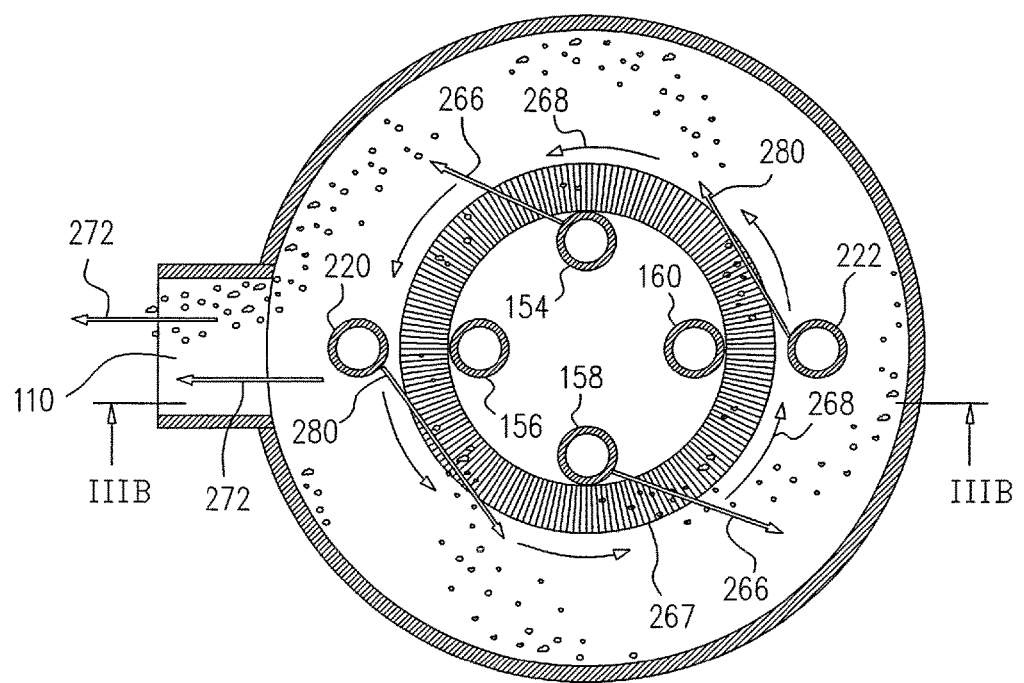
Figure 3A:
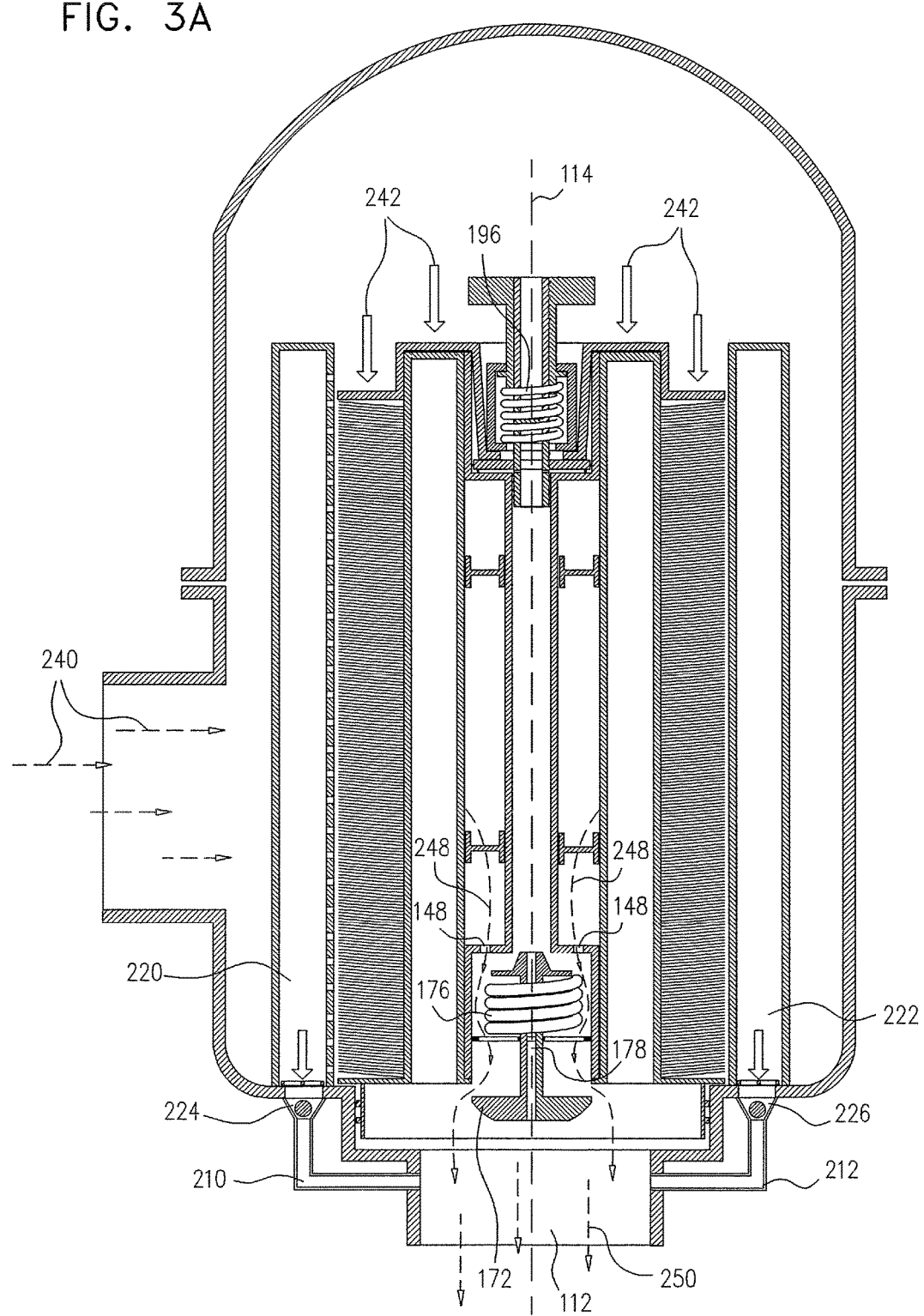
FIGS. 3A & 3B are simplified sectional illustrations of the operation of the backflushable disc filter of FIGS. 1A-2B in respective filtering and backflushing modes of operation, taken along respective lines IIIA-IIIA and IIIB-IIIB in respective FIGS. 2A & 2B.
Figure 3B:
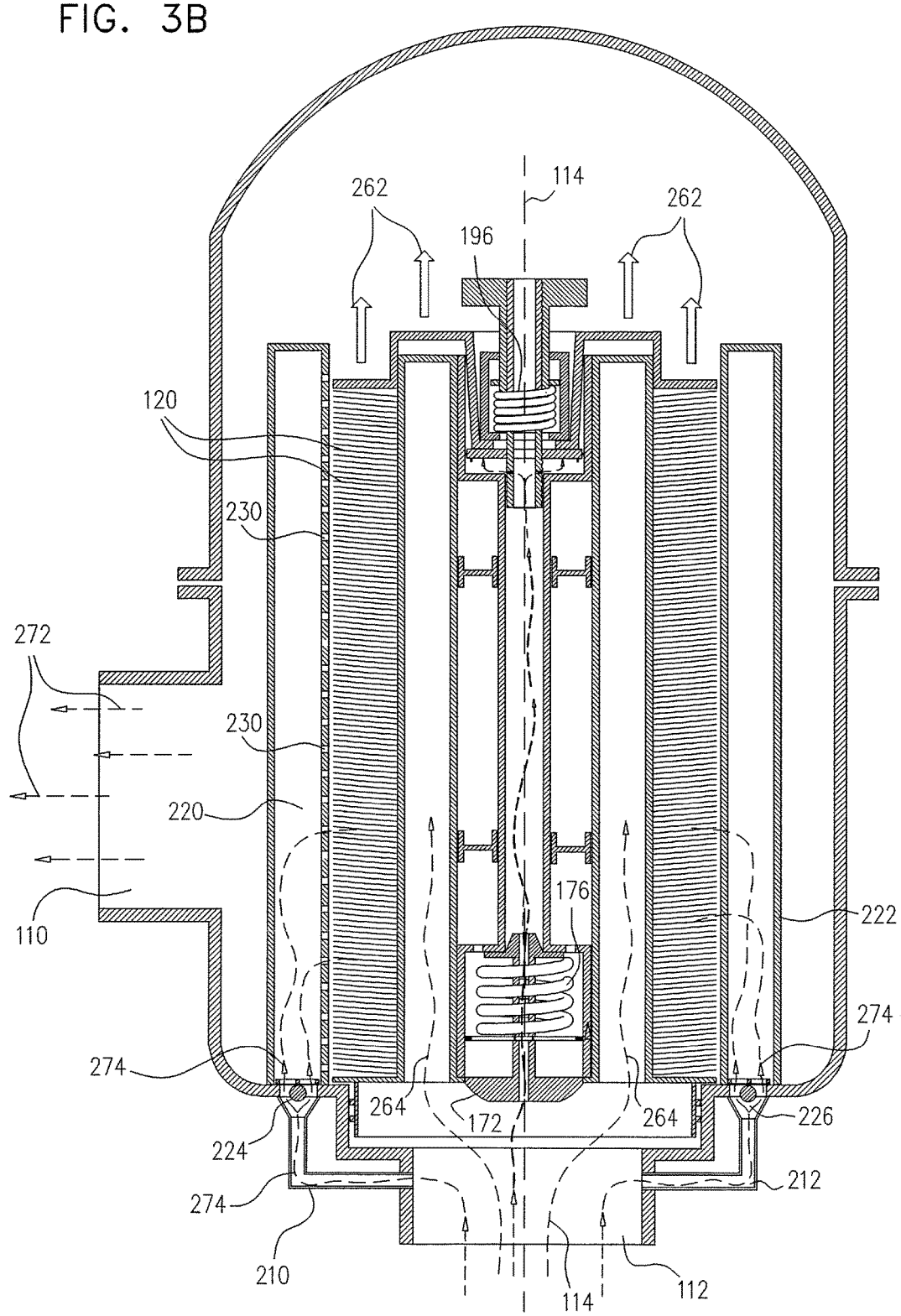

Reference is now made to FIGS. 1A & 1B, which are simplified partially cut away illustrations of the operation of a backflushable disc filter 100 constructed and operative in accordance with a preferred embodiment of the present invention in respective filtering and backflushing modes of operation, to FIGS. 2A & 2B, which are simplified sectional illustrations of the operation of backflushable disc filter 100, and to FIGS. 3A & 3B, which are simplified sectional illustrations of the operation of the backflushable disc filter 100.

As seen in FIGS. 1A-3B, filter 100 preferably includes a top housing portion 102 and a bottom housing portion 104 which are preferably sealingly clamped together to define a water tight housing enclosure, generally designated by reference numeral 108. Bottom housing portion 104 defines an inlet opening 110 for water to be filtered and a bottom outlet opening 112 for filtered water. Enclosure 108 has a general axis of symmetry designated by reference numeral 114.

Throughout this description, the terms "vertical", "upper" and "lower" and similar terms are defined with respect to axis 114, as seen in FIGS. 1A-3B, it being appreciated that the filter 100 and its axis 114 may be in any desired orientation.

Bottom housing portion 104 preferably includes a generally cylindrical portion 116, which defines bottom outlet opening 112, and an inwardly threaded broadened cylindrical portion 118.

Disposed within enclosure 108 there is provided a stack of generally radially grooved annular filter discs 120, which are maintained in a desired mutually stacked, overall generally cylindrical orientation by means of a core element 122, which is described below in greater detail with reference to FIGS. 4-5B and which preferably lies interiorly of and nearly touching the stack of discs 120.

Figure 5A:
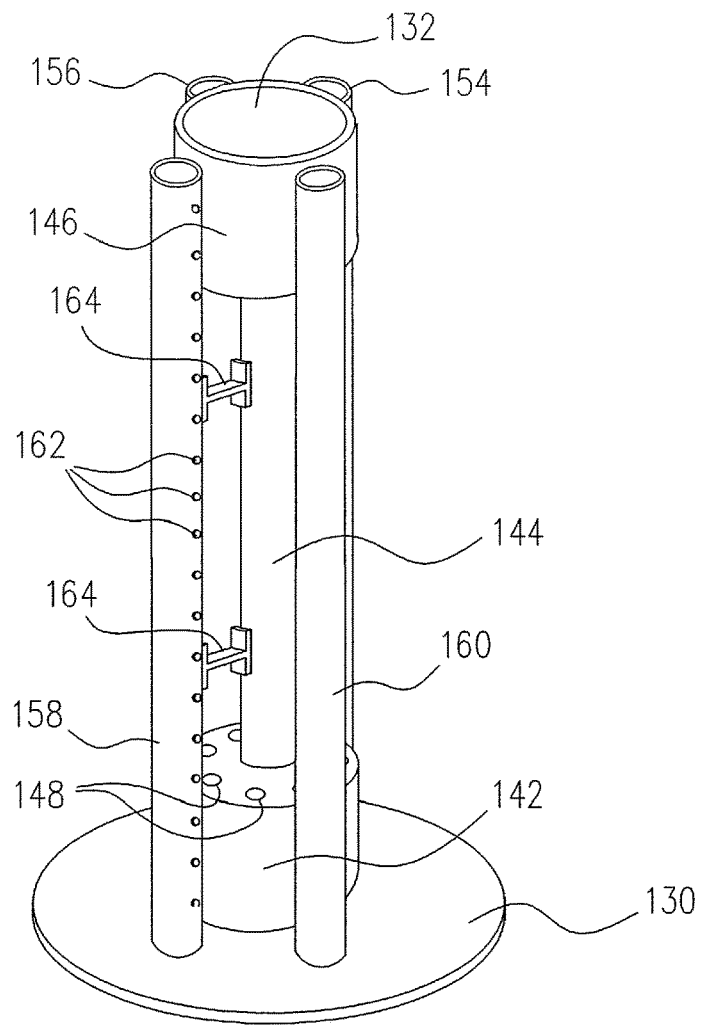
FIGS. 5A and 5B are simplified illustrations of a core, forming part of the backflushable disc filter of FIGS. 1A-4.
Figure 5B:
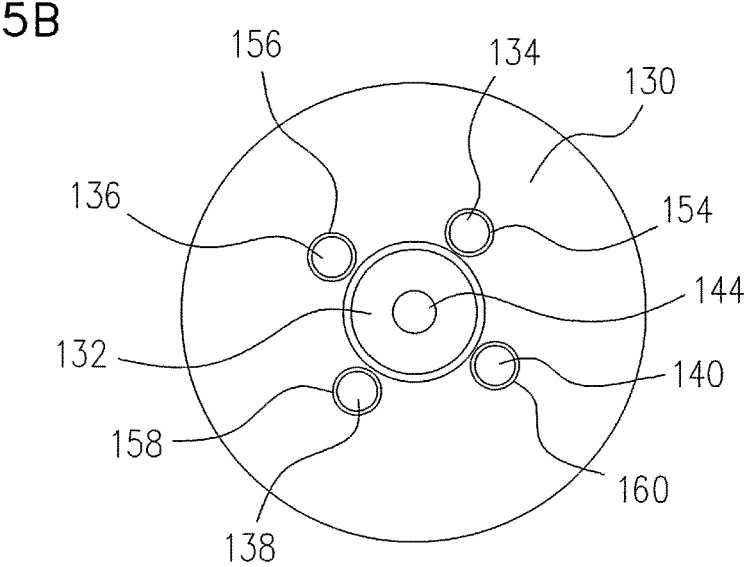

Referring now additionally to FIGS. 4-5B, it is seen that core element 122 is preferably an integrally formed element, injection molded of plastic, and has a generally cylindrical overall configuration. Core element 122 preferably includes a generally circular base plate portion 130 having a central aperture 132 and typically four apertures 134, 136, 138 and 140, all disposed outside of and separated from central aperture 132.

A lower piston housing portion 142 extends upwardly from base plate portion 130 at central aperture 132 and a center vertical conduit 144 extends upwardly from lower piston housing portion 142 to an upper piston housing portion 146. A plurality of water flow apertures 148 are formed preferably on a top facing surface of lower piston housing portion 142.

Four peripheral vertical conduits 154, 156, 158 and 160 extend upwardly from base plate portion 130 at respective apertures 134, 136, 138 and 140. The four peripheral vertical conduits 154, 156, 158 and 160 are disposed radially inside the stack of filter discs 120, and are positioned closer to the inside surface 267 than to the axis 114. One or more of vertical conduits 154, 156, 158 and 160 are formed with a vertical array of outwardly directed backflush water outlet apertures 162. Apertures 162 are preferably directed at an angle which is between a radial direction and a tangential direction. Preferably a plurality of lateral mechanical supports 164 extend between each of vertical conduits 154, 156, 158 and 160 and central vertical conduit 144.

Disposed below base plate portion 130 is an outwardly threaded cylindrical water flow portion 166 which is preferably threadably engageable with inwardly threaded broadened cylindrical portion 118 (FIGS. 1A, 1B, 3A & 3B).

Disposed within lower piston housing portion 142 is a spring loaded lower piston assembly 170, preferably including a piston element 172, a spring seat 174 and a compression spring 176. As seen in FIG. 3A, lower piston assembly 170 is in an open operative orientation during normal filtering operation and, as seen in FIG. 3B, lower piston assembly 170 is in a closed operative orientation during backflushing. As seen in sectional drawing A in FIG. 4, piston element 172 is formed with a throughgoing bore 178, which permits limited water flow therethrough even when lower piston assembly 170 is in a closed state.

Disposed within upper piston housing portion 146 is a spring loaded upper piston assembly 190, preferably including a piston plate 192, a spring seat 194, a compression spring 196, a stacked disc compression plate 198, a side apertured, top and bottom threaded conduit element 200 and a tightening nut 202. Upper piston assembly 190 is in a closed stacked disc compressing operative orientation during normal filtering operation, as seen in FIG. 3A, and in an open, non stacked disc compression operative orientation during backflushing, as seen in FIG. 3B.

Returning now to FIGS. 1A-3B, it is seen that at least one and preferably two backflow water conduits 210 and 212 communicate between the interior of generally cylindrical portion 116, which defines bottom outlet opening 112, and a pair of upstanding backflow water conduits 220 and 222, via respective one way check valves 224 and 226. It is a particular feature of the present invention that, as seen in FIGS. 1A & 1B, upstanding backflow water conduits 220 and 222 are provided with a generally vertical array of backflow water outlet apertures 230 which are directed tangentially so as to produce jets of water tangentially impinging onto outer surfaces 232 of the stack of generally radially grooved filter discs 120 during backflow operation of the filter 100, when the discs 120 are not compressed and are thus able to individually rotate.

Preferably but not necessarily, during backflushing, water jets from apertures 230 of upstanding conduits 220 and 222 impinge onto the outer surfaces 232 of the discs 120 at the same time and in the same rotational direction as the water flow from apertures 162 of peripheral vertical conduits 154, 156, 158 and 160, it being appreciated that a radial angular component of the water flow from apertures 230 is directed in a direction opposite to a radial component of the water flow from apertures 162 of peripheral vertical conduits 154, 156, 158 and 160.

The operation of the backflushable disc filter 100 constructed and operative in accordance with a preferred embodiment of the present invention will now be described with reference to FIGS. 1A-3B.

During normal filtering operation, as seen in FIGS. 1A, 2A and 3A, pressurized water to be filtered is supplied to the backflushable disc filter 100 at inlet opening 110, as indicated by arrows 240. The upper piston assembly 190 is closed, by the action of spring 196 and by the positive pressure differential acting on stacked disc compression plate 198, thus tightly compressing the stack of discs 120 along axis 114. The resulting compression of the stack of discs 120 is indicated schematically by arrows 242.

During normal filtering operation, as seen in FIGS. 1A, 2A and 3A, the lower piston assembly 170 is open, by the pressure differential between the interior of lower piston housing 142 and the interior of bottom outlet opening 112, which overcomes the urging of spring 176.

During normal filtering operation, water to be filtered passes through the vertically compressed stack of discs 120 from the outside surface thereof inwardly therethrough, as indicated by arrows 244, leaving particulate matter on the outer surfaces 232 of the stack of discs 120 and in the grooves of the discs 120. The filtered water passes into the volume interior of the stack of discs 120, as indicated by arrows 246, and passes through apertures 148, as indicated by arrows 248, into lower piston housing 142 and therethrough out through bottom outlet opening 112 as indicated by arrows 250. The water generally leaves the bottom outlet opening without ever entering the central vertical conduit 144.

During normal backflushing operation, as seen in FIGS. 1B, 2B and 3B, pressurized backflushing water is supplied to the backflushable disc filter 100 at outlet opening 112, as indicated by arrows 260, and inlet opening 110 is at atmospheric pressure. The lower piston assembly 170 is closed, by the pressure differential between interior of bottom outlet opening 112 and the interior of lower piston housing 142 and by the urging of spring 176.

During normal backflushing operation, the upper piston assembly 190 is open against the urging of spring 196 by the positive pressure differential acting on piston plate 192 by pressurized water within central vertical conduit 144, which is coupled via the interior of lower piston housing 142 and throughgoing bore 178 to the pressurized interior of outlet opening 112. It is appreciated that during normal backflushing operation the interior of enclosure 118 outside of the stack of discs 120 communicates with the inlet opening 110 and is thus at atmospheric pressure. The open state of upper piston assembly 190 causes upward displacement of stacked disc compression plate 198, as indicated by arrows 262, thus allowing the discs 120 to rotate somewhat independently of each other about axis 114.

During normal backflushing operation, backflushing water passes through one or more of vertical conduits 154, 156, 158 and 160, as indicated by arrows 264, and out of water outlet apertures 162, as indicated by arrows 266, as jets of backflushing water. The jets of backflushing water impinge on the non-compressed stack of discs 120 at inside surfaces 267 thereof and may cause rotation of at least some of the discs 120 about axis 114, as indicated by arrows 268. The jets of backflushing water cause backflushing water to pass between the non-compressed discs and outwardly therethrough, as indicated by arrows 270, flushing particulate matter from the outer surface of the stack of discs 120 and from the grooves of the discs 120. The backflushing water, including the flushed particulate matter, passes into the volume interior of enclosure 108 and exterior of the stack of discs 120, as indicated by arrows 266, and passes out of enclosure 108 via inlet opening 110, as indicated by arrows 272.

It is a particular feature of an embodiment of the present invention that during backflushing operation backflushing water also passes through backflow water conduits 210 and 212 from outlet opening 112 to upstanding backflow water conduits 220 and 222, via respective one way check valves 224 and 226, as indicated by arrows 274, and through the generally vertical array of backflow water outlet apertures 230, as indicated by arrows 280, which are directed tangentially so as to produce jets of water tangentially impinging onto the outer surfaces 232 of the stack of generally radially grooved filter discs 120, when the discs 120 are not compressed and are thus able to individually rotate.

It is a particular feature of the present invention that jets of backflushing liquid emanating from the array of backflow water outlet apertures 230 in conduits 220 and 222 both slough off contaminants from outer surfaces 232 and produce rotation of the discs 120 which are loosely held together. It is appreciated that the rotation of the discs 120, produced by the action of the jets, may produce different extents of rotation of mutually adjacent discs 120 in the stack, thus further enhancing sloughing off of contaminants from outer surfaces 232.

Figure 6A:
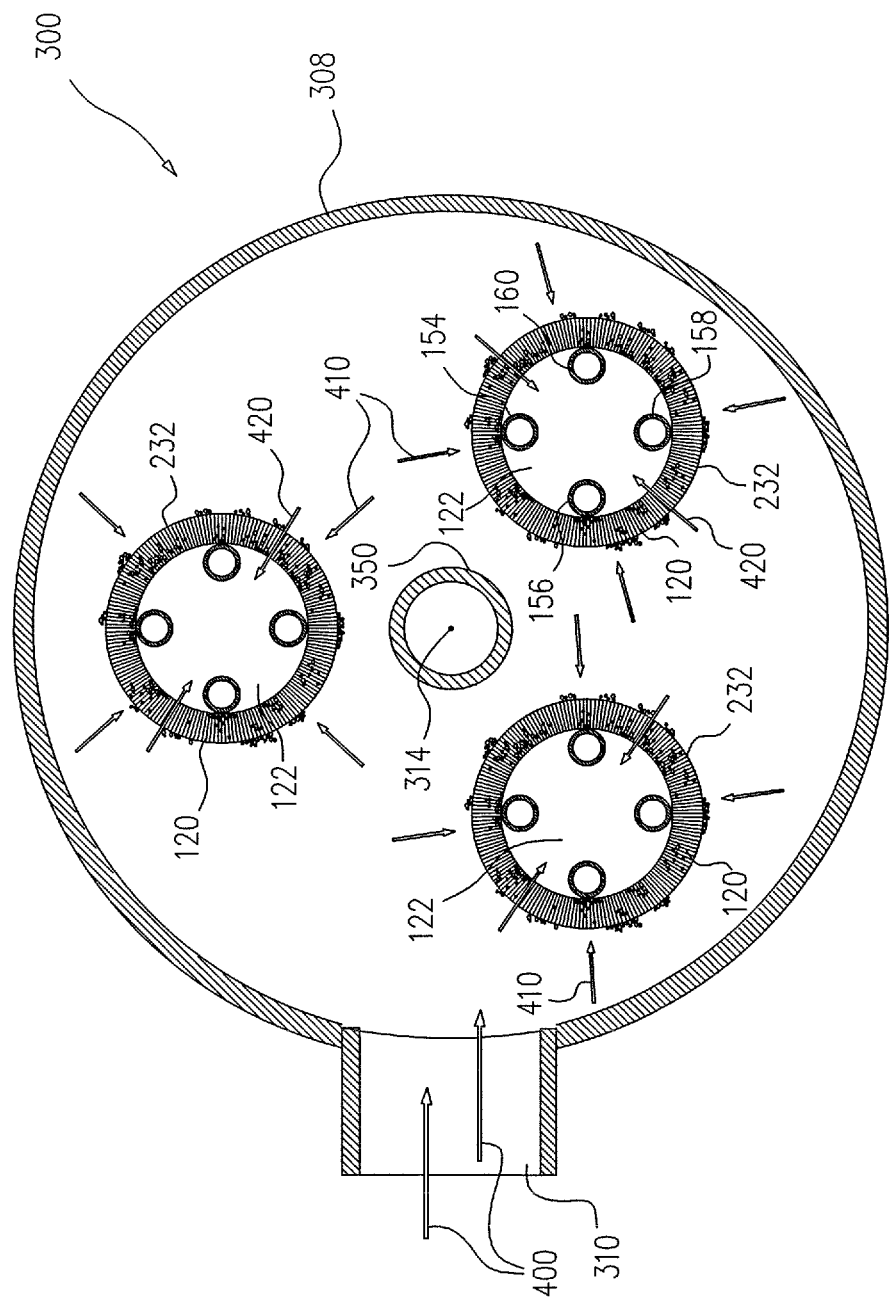
FIGS. 6A & 6B are simplified sectional illustrations of the operation of a backflushable disc filter constructed and operative in accordance with another preferred embodiment of the present invention in respective filtering and backflushing modes of operation.
Figure 6B:
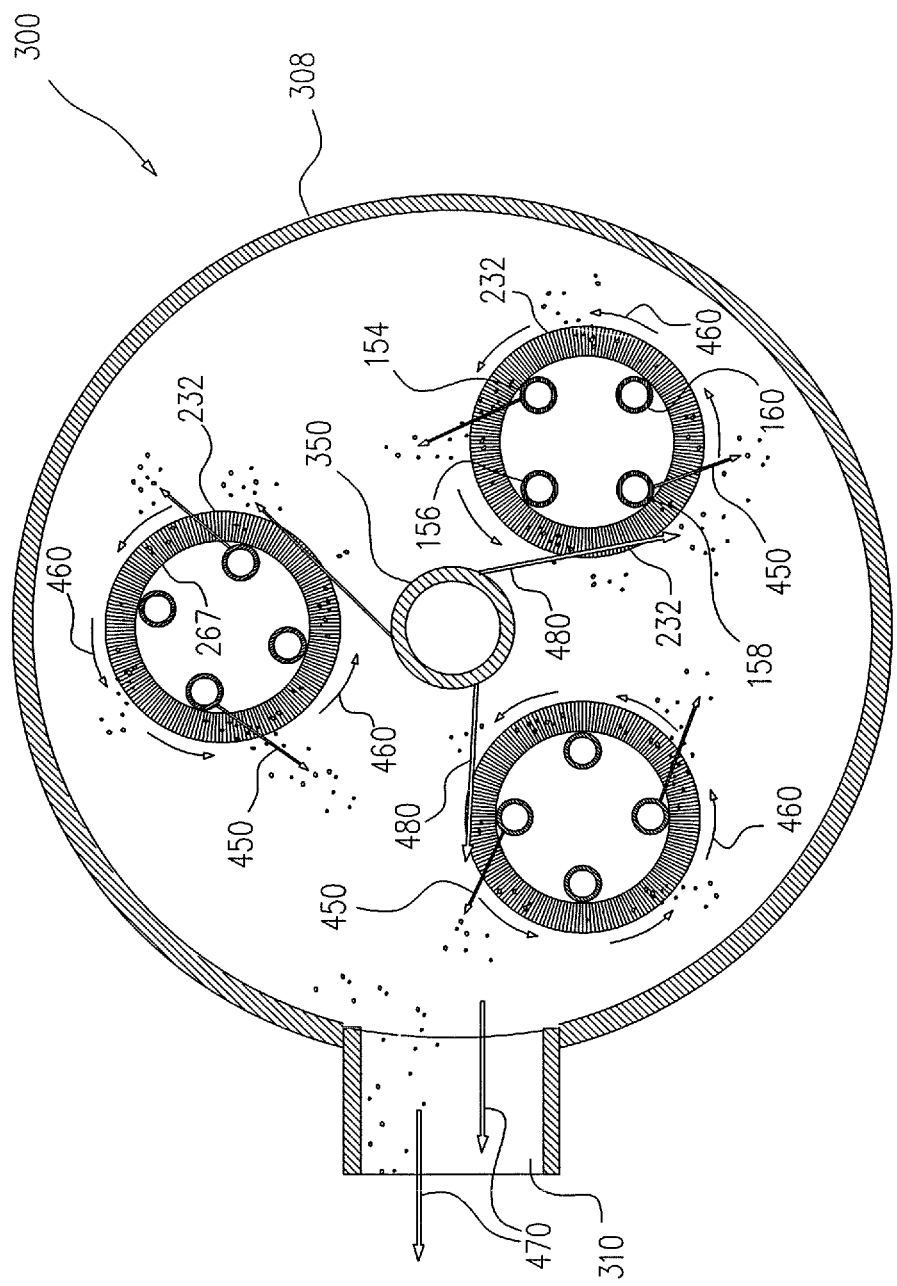

Reference is now made to FIGS. 6A and 6B, which are simplified sectional illustrations of the operation of a backflushable disc filter 300 constructed and operative in accordance with another preferred embodiment of the present invention in respective filtering and backflushing modes of operation.

As seen in FIGS. 6A and 6B, backflushable disc filter 300 preferably includes a housing 308, defining an inlet opening 310 and a bottom outlet opening (not shown). Housing 308 has a general axis of symmetry designated by reference numeral 314. Throughout this description, the terms "vertical", "upper" and "lower" and similar terms are defined with respect to axis 314, as seen in FIGS. 6A-6B, it being appreciated that the filter 300 and axis 314 may be in any desired orientation.

Disposed within housing 308 there is provided a plurality of stacks of generally radially grooved filter discs 120 spaced apart from one another in a top view of the disc filter, each stack having its own vertical stack axis, each stack of discs being maintained in a desired mutually stacked, overall generally cylindrical orientation by means of a core element 122, described hereinabove with reference to FIGS. 4-5B, which preferably lies interiorly of and nearly touching the stack of discs 120.

Similar to the embodiment described with reference to FIGS. 1A-3B, during normal filtering operation, lower piston assemblies 170 are in an open operative orientation and upper piston assemblies 190 are in a closed stacked disc compressing operative orientation. During backflushing, lower piston assemblies 170 are in a closed operative orientation and upper piston assemblies 190 are in an open, non-stacked disc compression operative orientation.

In the embodiment of FIGS. 6A and 6B filter 300 includes an upstanding backflow water conduit 350 communicating with the bottom outlet opening, preferably via a one way check valve. It is a particular feature of the present invention that upstanding backflow water conduit 350 is provided with a generally vertical arrays of backflow water outlet apertures, similar to apertures 230 of conduits 220 and 222 described hereinabove, which are directed tangentially so as to produce jets of water tangentially impinging onto outer surfaces 232 of each of the plurality of stacks of generally radially grooved filter discs 120 during backflow operation of filter 300, when discs 120 are not compressed and are thus able to individually rotate.

Preferably but not necessarily, during backflushing, water jets from apertures formed in upstanding backflow water conduit 350 impinge onto the outer surfaces 232 of the discs 120 at the same time and in the same rotational direction as the water flow from apertures 162 of vertical conduits 154, 156, 158 and 160, it being appreciated that a radial angular component of the water flow from backflow water outlet apertures of upstanding backflow water conduit 350 is directed in a direction opposite to a radial component of the water flow from the outwardly directed backflush water outlet apertures 162 of vertical conduits 154, 156, 158 and 160.

The operation of the backflushable disc filter 300 will now be described with reference to FIGS. 6A-6B.

During normal filtering operation, as seen in FIG. 6A, pressurized water to be filtered is supplied to the backflushable disc filter 300 at inlet opening 310, as indicated by arrows 400. The upper piston assemblies 190 are closed, by the action of springs 196 and by the positive pressure differential acting on stacked disc compression plates 198, thus tightly compressing the stacks of discs 120 along axes 114. During normal filtering operation, the lower piston assemblies 170 are open, by the pressure differential between the interior of lower piston housings 142 and the interior of bottom outlet openings, which overcomes the urging of springs 176.

During normal filtering operation, water to be filtered passes through the vertically compressed stacks of discs 120 from the outside surface thereof inwardly therethrough, as indicated by arrows 410, leaving particulate matter on the outer surfaces 232 of the stacks of discs 120 and in the grooves of the discs 120. The filtered water passes into the volume interior, of the stack of discs 120, as indicated by arrows 420, and passes through apertures 148 into lower piston housing 142 and therethrough out through bottom outlet opening.

During normal backflushing operation, as seen in FIG. 6B, pressurized backflushing water is supplied to the backflushable disc filter 300 at bottom outlet opening and inlet opening 310 is at atmospheric pressure. The lower piston assemblies 170 are closed, by the pressure differential between interior of bottom outlet opening and the interior of the lower piston housings 142 and by the urging of springs 176.

During normal backflushing operation, the upper piston assemblies 190 are open against the urging of springs 196 by the positive pressure differential acting on piston plates 192 by pressurized water within central vertical conduits 144, which are coupled via the interior of lower piston housings 142 and throughgoing bores 178 to the pressurized interior of the bottom outlet opening. The open state of upper piston assemblies 190 causes upward displacement of stacked disc compression plates 198 thus allowing discs 120 to rotate somewhat independently of each other about axes 114.

During normal backflushing operation, backflushing water passes through one or more of vertical conduits 154, 156, 158 and 160 and out of water outlet apertures 162, as indicated by arrows 450, as jets of backflushing water. The jets of backflushing water impinge on the non-compressed stack of discs 120 at inside surfaces 267 thereof and may cause rotation of at least some of the discs 120 about axes 114, as indicated by arrows 460. The jets of backflushing water cause backflushing water to pass between the non-compressed discs and outwardly therethrough, as indicated by arrows 450, flushing particulate matter from the outer surfaces 232 of the stack of discs 120 and from the grooves of the discs 120. The backflushing water, including the flushed particulate matter, passes into the volume interior of housing 308 and exterior of the stacks of discs 120, as indicated by arrows 450, and passes out of housing 308 via inlet opening 110, as indicated by arrows 470.

It is a particular feature of an embodiment of the present invention that during backflushing operation backflushing water also passes into upstanding backflow water conduit 350, via the one way check valve and through the generally vertical array of backflow water outlet apertures of upstanding backflow water conduit 350, as indicated by arrows 480, which are directed tangentially so as to produce jets of water tangentially impinging onto the outer surfaces 232 of the stack of generally radially grooved filter discs 120, when the discs 120 are not compressed and are thus able to individually rotate.

It is a particular feature of the present invention that jets of backflushing liquid emanating from the array of backflow water outlet apertures of upstanding backflow water conduit 350 both slough off contaminants from outer surfaces 232 and produce rotation of the discs 120 which are loosely held together. It is appreciated that the rotation of the discs 120, produced by the action of the jets may produce different extents of rotation of mutually adjacent discs 120 in the stack, thus further enhancing sloughing off of contaminants from outer surfaces 232.

It will be appreciated by persons skilled in the art that the present invention is not limited by what has been particularly shown and described hereinabove. Rather the scope of the present invention includes both combinations and sub-combinations of features described hereinabove as well as modifications and variations thereof which would occur to a person of skill in the art upon reading the foregoing and which are not in the prior art.

The invention claimed is:

1. A disc filter comprising:
 a housing enclosure having a first housing opening configured to receive liquid during a filtering operation and configured to emit liquid during a backflushing operation, and a second housing opening configured to receive liquid during the backflushing operation and configured to emit liquid during the filtering operation;
 at least one stack of apertured filter discs arranged about an axis, said at least one stack having an outer surface and an inner surface and being mounted such that during the backflushing operation, individual discs are rotatable relative to adjacent discs about said axis; and
 a disc cleaning assembly operative to rotate at least some of said discs in said at least one stack about said axis relative to others of said discs in said at least one stack, said disc cleaning assembly including:
  at least two first fluid conduits positioned outside of the at least one stack, each first fluid conduit configured to receive liquid that entered the housing enclosure through the second housing opening and the at least one first fluid conduct is configured to emit at least one outer liquid jet directed tangentially into engagement with said outer surface of said at least one stack for rotationally driving said at least some of said discs in said at least one stack about said axis relative to others of said discs in said at least one stack;
  at least one second fluid conduit positioned inside of the at least one stack, the at least one second fluid conduit configured to receive liquid that entered the housing enclosure through the second housing opening and the at least one second fluid conduit is configured to emit at least one inner backflushing liquid jet directed into engagement with said inner surface of said at least one stack; and
  a one-way check valve positioned between each of the at least two first fluid conduits and the second housing opening,
 wherein:
 during the filtering operation, said one-way check valve is configured to prevent liquid present in a corresponding first fluid conduit from exiting the housing via the second housing opening; and
 during the backflushing operation, said first fluid conduits and said at least one second fluid conduit are configured to simultaneously produce said at least one outer liquid jet and said at least one inner backflushing liquid jet.

2. A disc filter according to claim 1 wherein said at least one stack of apertured filter discs is arranged in a compressed stacked disc operative orientation during filtering operation and arranged in a non-compressed disc operative orientation during backflushing operation.

3. A disc filter according to claim 1 comprising a core element lying interiorly of each of said at least one stack of apertured filter discs.

4. A disc filter according to claim 3 wherein said core element includes a central vertical conduit distinct from the at least one second fluid conduit.

5. A disc filter according to claim 3 wherein said core element includes at least one peripheral vertical conduit as the at least one second fluid conduit.

6. A disc filter according to claim 5 wherein at least one of said at least one peripheral vertical conduit is formed with a vertical array of outwardly directed backflush water outlet apertures.

7. A disc filter according to claim 3 comprising:
a first piston assembly disposed within said core element; and
a second piston assembly disposed within said core element.

8. A disc filter according to claim 7 wherein:
in a filtering operative orientation, said first piston assembly is in an open state and said second piston assembly is in a closed state; and
in a backflushing operative orientation, said first piston assembly is in a closed state and said second piston assembly is in an open state.

9. A disc filter according to claim 8 wherein in said filtering operative orientation, said first piston assembly is operative to allow filtered water to flow therethrough from the first housing opening to the second housing opening.

10. A disc filter according to claim 9 wherein said first piston assembly comprises a piston element including a throughgoing bore, wherein said throughgoing bore allows water to flow therethrough into a central vertical conduit even when said first piston assembly is in said closed state.

11. A disc filter according to claim 1 wherein said at least one first fluid conduit comprises at least one upstanding backflow water conduit including a vertical array of backflow water outlet apertures.

12. A disc filter according to claim 1 wherein:
said at least one stack of apertured filter discs comprises a plurality of stacks of apertured filter discs spaced apart from one another in a top view of the disc filter, each stack having its own vertical stack axis; and
said disc cleaning assembly comprises at least one first fluid conduit including a plurality of vertical arrays of tangentially directed backflow water outlet apertures, each of said plurality of vertical arrays providing a plurality of outer located liquid jets directed tangentially into engagement with a different stack of said plurality of stacks.

13. A disc filter according to claim 12 wherein said apertured filter discs comprise radially grooved filter discs.

14. A disc filter according to claim 1 wherein said apertured filter discs comprise radially grooved filter discs.

15. A disc filter for filtering a liquid, comprising:
a housing enclosure having a first housing opening and a second housing opening;
at least one stack of annular filter discs arranged about a vertical stack axis and mounted within the housing enclosure, the at least one stack having an outer surface and an inner surface;
at least one vertical inner conduit disposed interior of the stack, the at least one vertical inner conduit being in fluid communication with the second housing opening, and further having an array of outwardly directed first outlet apertures arranged along a vertical length of the at least one inner conduit;
at least two upstanding outer conduits disposed exterior of the stack, the at least two outer conduits also being in fluid communication with the second housing opening, and each outer conduit further having an array of second outlet apertures arranged along a length of said each outer conduit; and
a one-way check valve positioned between each of said outer conduits and the second housing opening;
wherein the disc filter is configured such that:
during a filter operation:
liquid enters the housing via the first housing opening, passes between the annular filter discs, and exits the housing via the second housing opening; and
the one-way check valve is configured to prevent liquid present in a corresponding outer conduit from exiting the housing via the second housing opening; and
during a backflush operation:
backflush liquid enters the housing enclosure via the second housing opening;
after entering via the second housing opening, a first portion of the backflush liquid enters the at least one inner conduit and travels upwards before being emitted through the first outlet apertures towards the inner surface of the stack;
after entering via the second housing opening, a second portion of the backflush liquid flows past the one-way check valves and travels upwards through the corresponding outer conduits before being emitted through the second outlet apertures towards the outer surface of the stack; and
the backflush liquid exits the housing enclosure via the first housing opening.

16. The disc filter according to claim 15, further comprising:
a backflow liquid conduit connecting each of said outer conduits to the second housing opening; wherein:
during the backflush operation, the second portion of liquid passes through the backflow liquid conduits, but the first portion of liquid entering the at least one inner conduit does not.

17. The disc filter according to claim 16, wherein:
each one-way check valve is positioned in between a corresponding backflow liquid conduit and a corresponding outer conduit.

18. The disc filter according to claim 16, comprising:
two outer conduits, each connected to the second housing opening via a corresponding backflow liquid conduit; and
four inner conduits disposed radially inside the stack of annular filter discs, each of the four inner conduits being positioned closer to the inner surface of the stack than to the vertical stack axis.

19. The disc filter according to claim 15, wherein:
the first outlet apertures are directed at an angle which is between a radial direction and a tangential direction, relative to inner surfaces of said at least one stack; and
the second outlet apertures are directed tangentially so as to produce jets of fluid tangentially impinging onto outer surfaces of said at least one stack during the backflush operation.

20. The disc filter according to claim 15, further comprising:
a core element disposed interior of each of said at least one stack of annular filter discs;
the core element comprising an upper piston assembly at an upper end thereof, a lower piston assembly at a lower end thereof, a plurality of the inner conduits and a central vertical conduit; wherein:
during the filtering operation, fluid does not enter the central vertical conduit; and
during the backflush operation, fluid enters the central vertical conduit via the lower piston assembly.

21. The disc filter according to claim 20, wherein:
the lower piston assembly comprises a piston element having a throughgoing bore formed therein; and
during the backflush operation, fluid enters the central vertical conduit via the throughgoing bore of the piston element.

22. The disc filter according to claim 20, wherein:
during the backflush operation, the upper piston assembly is opened by the fluid within central vertical conduit.

23. The disc filter according to claim 20, wherein:
the core element is threadably engaged to a bottom housing portion of the housing enclosure.

24. The disc filter according to claim 15, comprising:
a plurality of stacks of annular filter discs spaced apart from one another in a top view of the disc filter, each stack having its own vertical stack axis; wherein:
each of the least two outer conduits is disposed along another axis of the housing enclosure between said plurality of stacks of annular filter discs.

25. The disc filter according to claim 24, wherein:
the array of second outlet apertures of each of the outer conduits are directed tangentially so as to produce outer jets of water tangentially impinging onto outer surfaces of each of the plurality of stacks of annular filter discs, during the backflush operation.

26. The disc filter according to claim 15, wherein:
the annular filter discs comprise radially grooved filter discs.

27. A disc filter comprising:
a housing enclosure having a first housing opening configured to receive liquid during a filtering operation and configured to emit liquid during a backflushing operation, and a second housing opening configured to receive liquid during the backflushing operation and configured to emit liquid during the filtering operation;
at least one stack of apertured filter discs arranged about an axis, said at least one stack having an outer surface and an inner surface and being mounted such that during the backflushing operation, individual discs are rotatable relative to adjacent discs about said axis; and
a disc cleaning assembly operative to rotate at least some of said discs in said at least one stack about said axis relative to others of said discs in said at least one stack, said disc cleaning assembly including:
at least two first fluid conduits positioned outside of the at least one stack and arranged vertically relative to the housing enclosure, each first fluid conduit comprising an array of apertures along a periphery thereof,
each first fluid conduit configured to receive liquid that entered the housing enclosure through the second housing opening and emit a plurality of outer liquid jets from the array of apertures, the plurality of outer liquid jets configured to be directed tangentially into engagement with said outer surface of said at least one stack;
a one-way check valve positioned between each of said first fluid conduits and the second housing opening;
at least two second fluid conduit positioned inside of the at least one stack and arranged vertically relative to the housing enclosure, each second fluid conduit comprising an array of apertures along a periphery thereof,
each second fluid conduit configured to receive liquid that entered the housing enclosure through the second housing opening and emit a plurality of inner backflushing liquid jets from the array of apertures, the plurality of inner backflushing jets configured to be directed into engagement with said inner surface of said at least one stack;
a first piston assembly disposed adjacent to a bottom of the at least one stack; and
a second piston assembly disposed adjacent to a top of the at least one stack;
wherein said first piston assembly comprises a piston element including a throughgoing bore,
wherein said first piston assembly is configured to be closed during the backflushing operation, and when the first piston assembly is closed, said throughgoing bore is configured to permit water to travel from the second housing opening to within the inner surface of the at least one stack without initially passing through the at least one second fluid conduit,
wherein the one-way check valves are configured to be open during the backflushing operation, such that liquid entering the second housing flows past the one-way check valves before being received by the first fluid conduits, emitted out of the array of apertures in the form of outer liquid jets, and being emitted out of the housing enclosure through the first housing opening, and
wherein the one-way check valves are configured to be closed during the filtering operation, such that liquid flowing from the first housing opening into the first fluid conduits through the array of apertures therein, is prevented from reaching the second housing opening.

28. The disc filter according to claim 27, wherein backflushing water passing through the throughgoing bore when said first piston assembly is closed is configured to provide a force to open the second piston assembly.

29. A disc filter comprising:
a housing enclosure having a first housing opening configured to receive liquid during a filtering operation and configured to emit liquid during a backflushing operation, and a second housing opening configured to receive liquid during the backflushing operation and configured to emit liquid during the filtering operation;
at least one stack of apertured filter discs arranged about an axis, said at least one stack having an outer surface and an inner surface and being mounted such that during the backflushing operation, individual discs are rotatable relative to adjacent discs about said axis; and
a disc cleaning assembly operative to rotate at least some of said discs in said at least one stack about said axis relative to others of said discs in said at least one stack, said disc cleaning assembly including:
at least two first fluid conduits positioned outside of the at least one stack and arranged vertically relative to the housing enclosure, each first fluid conduit comprising an array of apertures along a periphery thereof,
each first fluid conduit configured to receive liquid that entered the housing enclosure through the second housing opening and emit a plurality of outer liquid jets from the array of apertures, the plurality of outer jets configured to be directed tangentially into engagement with said outer surface of said at least one stack;
a one-way check valve positioned between each of said first fluid conduits and the second housing opening;
at least two second fluid conduits positioned inside of the at least one stack and arranged vertically relative to the housing enclosure, each second fluid conduit comprising an array of apertures along a periphery thereof,
each second fluid conduit configured to receive liquid that entered the housing enclosure through the second housing opening and configured to emit a plurality of inner backflushing liquid jets from the array of apertures, the plurality of inner backflushing jets configured to be directed into engagement with said inner surface of said at least one stack, wherein the one-way check valves are configured to be open during the backflushing operation, such that liquid entering the second housing flows past the one-way check valves before being received by the first fluid conduits, emitted out of the array of apertures in the form of outer liquid jets, and being emitted out of the housing enclosure through the first housing opening, and wherein the one-way check valves are configured to be closed during the filtering operation, such that liquid flowing from the first housing opening into the first fluid conduits through the array of apertures therein, is prevented from reaching the second housing opening.

30. The disc filter according to claim 29, wherein, each one-way check valve is positioned in between a corresponding first fluid conduit and a backflow liquid conduit which connects the second housing opening to said corresponding first fluid conduit.

31. A disc filter comprising:

a housing enclosure having a first housing opening configured to receive liquid during a filtering operation and configured to emit liquid during a backflushing operation, and a second housing opening configured to receive liquid during the backflushing operation and configured to emit liquid during the filtering operation;

at least one stack of apertured filter discs arranged about an axis, said at least one stack having an outer surface and an inner surface and being mounted such that during the backflushing operation, individual discs are rotatable relative to adjacent discs about said axis; and a disc cleaning assembly operative to rotate at least some of said discs in said at least one stack about said axis relative to others of said discs in said at least one stack, said disc cleaning assembly including:

at least two first fluid conduits positioned outside of the at least one stack, each first fluid conduit configured to receive liquid that entered the housing enclosure through the second housing opening and further configured to emit at least one outer liquid jet directed tangentially into engagement with said outer surface of said at least one stack for rotationally driving said at least some of said discs in said at least one stack about said axis relative to others of said discs in said at least one stack;

at least one second fluid conduit positioned inside of the at least one stack, the at least one second fluid conduit having a vertical array of outwardly directed backflush water outlet apertures which are directed at an angle which is in a radial direction, the at least one second fluid conduit configured to receive liquid that entered the housing enclosure through the second housing opening, and further configured to emit inner backflushing liquid jets directed at said angle which is in a radial direction, into engagement with said inner surface of said at least one stack, through said vertical array of outwardly directed backflush water outlet apertures; and a one-way check valve positioned between each of the at least two first fluid conduits and the second housing opening;

wherein, during the filtering operation, said one-way check valve is configured to prevent liquid present in a corresponding first fluid conduit from exiting the housing via the second housing opening; and wherein, during the backflushing operation:

the first fluid conduits are configured to produce said at least one outer liquid jet directed tangentially into engagement with said outer surface while, simultaneously, said at least one second fluid conduit is configured to produce said inner backflushing liquid jets directed at said angle which is in a radial direction, into engagement with said inner surface of said at least one stack.

* * * * *